W. R. WILSON.
ROLLER BEARING CONSTRUCTION FOR VEHICLE WHEELS.
APPLICATION FILED SEPT. 1, 1916.
1,261,665.
Patented Apr. 2, 1918.
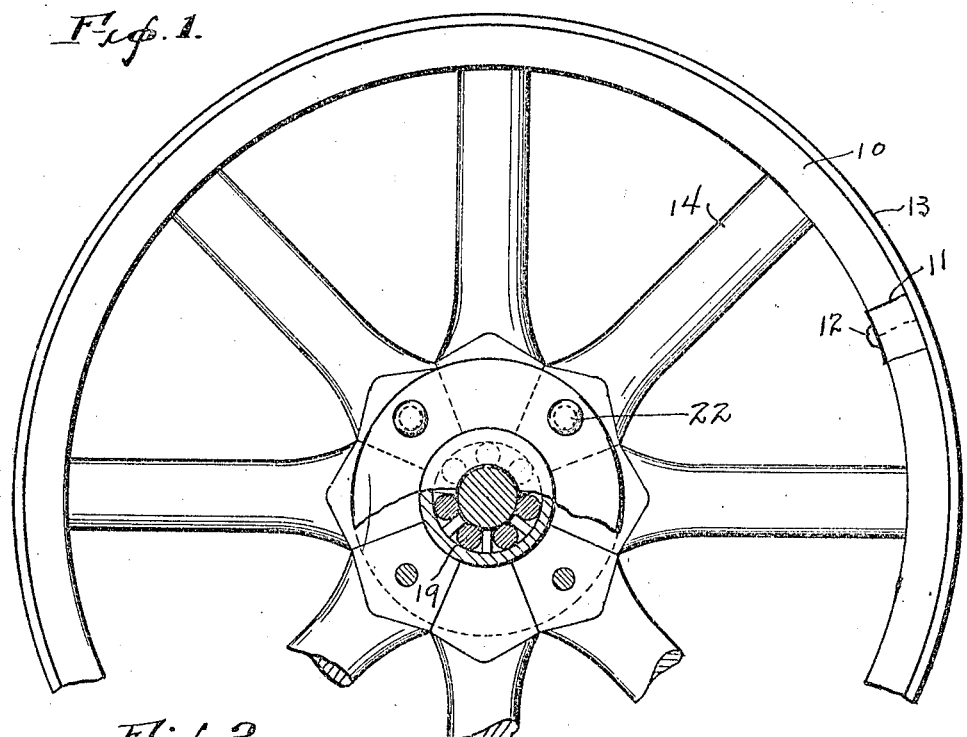
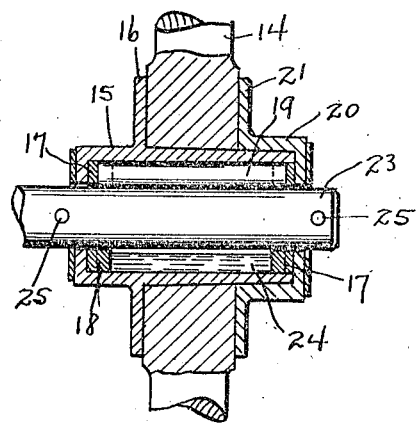
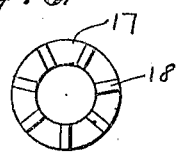
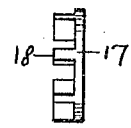
WITNESSES:
INVENTOR
William R Wilson
BY
Lockwood & Lockwood
ATTORNEYS

UNITED STATES PATENT OFFICE.

WILLIAM R. WILSON, OF TERRE HAUTE, INDIANA, ASSIGNOR TO WABASH MANUFACTURING COMPANY, OF TERRE HAUTE, INDIANA, A CORPORATION.

ROLLER-BEARING CONSTRUCTION FOR VEHICLE-WHEELS.

1,261,665.  Specification of Letters Patent.  Patented Apr. 2, 1918.

Application filed September 1, 1916. Serial No. 118,024.

*To all whom it may concern:*

Be it known that I, WILLIAM R. WILSON, a citizen of the United States, and a resident of Terre Haute, county of Vigo, and State of Indiana, have invented certain new and useful Roller-Bearing Constructions for Vehicle-Wheels, and I do hereby declare that the following is a full, clear, and exact description thereof, reference being had to the accompanying drawings, in which like letters refer to like parts.

The object of this invention is to improve and cheapen the method of manufacture of wooden wheels having roller bearings, strengthen and stabilize the hub and spokes in their relation to each other, and improve the construction of the bearings.

Another feature of this invention is the construction of the hub and roller bearing retainer on said hub for holding the bearings in position and allowing spaces therein for lubrication of said bearings.

The retainers for the ends of the rollers are radially disposed so that they are wider apart at their outer edges than their inner edges and are arranged so as to prevent the escape of the rollers inwardly when the axle is removed and yet allow the rollers to be free from frictional engagement with the retainers when the load is on the rollers.

The full nature of the invention will be understood from the accompanying drawings and the following description and claims:

In the drawings, Figure 1 is a side elevation of the wheel with portions thereof broken away and showing a portion of the hub in cross section. Fig. 2 is a cross section on the line 2—2 of Fig. 1. Fig. 3 is a plan view of the bearing retainer. Fig. 4 is a side elevation of the bearing retainer.

In the drawings there is shown a wheel rim 10 which is divided into two sections which are secured together by the clamps 11 and screws 12. Said rim is surrounded by a tire 13. Extending into said rim there is a plurality of spokes 14 which have their inner ends beveled so as to make them lie adjacent to each other at the center of said wheel, the points thereof extending inwardly and meeting at the center. The wheel being formed as above described, a hole is bored through the center of said spokes concentric with said wheel into which there is adapted to be driven a slightly tapering hub member 15. Said hub member is wedged securely through said hole so that the flange 16 rests against one side of the spokes. The inner ends of the spokes, therefore, bear directly upon the outer surface of said hub. There is then inserted inside of said hub at each end thereof a bearing retainer 17 having radial projections or extensions extending inwardly from the periphery thereof at given intervals. The bearings 19 are spaced apart by said projections. The hub cap 20 having a flange 21 is then secured over the open end of the hub member so that the flange 21 rests securely against the spokes. The bolts 22 pass through said flanges 16 and 21 and through the spokes for securing the hub member and the hub cap together and locking the spokes therein. The axle 23 passes through the center of the hub member and the hub cap and rests between the roller bearings. By means of the radial projections 18 on the bearing retainer 17 which space the bearings from each other, a space is left which will hold grease or oil 24 for lubrication of the bearings. Any suitable means may be used for holding the hub in place on the axle, but there is shown herein pins 25.

It may readily be seen that this invention provides a strongly constructed and easily assembled hub including roller bearings and a lubricating space adjacent each bearing.

The invention claimed is:

1. In a vehicle wheel, a hollow hub member open at one end, and having an integral peripheral flange positioned inwardly from the closed end thereof, the outer face of the member being tapered from the flange to its open end, a pair of washer-like retainers in said hub member one at each end, flat radial projections extending inwardly from the inner faces of said retainers, a plurality of bearing rollers having their ends positioned between said projections and spaced apart to form oil chambers, a cap fitting over the open end of said hub member and having a radial integral flange at its inner edge for coöperation with the flange of the hub member, the closed ends of said hub and cap and said retainers having alining openings for the reception of a spindle.

2. In a vehicle wheel, a hollow hub member having one end closed and the other open, a pair of flat washer-like retainers in said hub one adjacent each end thereof, flat projections extending inwardly at right angles to the inner faces of said retainers, bearing rollers having their ends seated between said projections and held in spaced relation thereby, the space between the inner edges of said projections being less than the diameter of said rollers to prevent said rollers from passing between said inner edges, and a cap adapted to fit over the open end of said hub member, whereby an oil chamber will be formed within the hub member.

3. In a vehicle wheel, a hollow hub member, a pair of flat washer-like retainers in said hub, one adjacent each end thereof, flat projections extending inwardly at right-angle to the inner faces of said retainers, bearing rollers having their ends seated between said projections, the space between the outer edges of said projections being greater than the diameter of said roller whereby, when an outward thrust is given said rollers no part of the thrust will be directed against said retainers or projections, and the space between the inner edges of said projections being less than the diameter of said rollers whereby said rollers will be prevented from passing inwardly from between said projections.

4. In a vehicle wheel, the combination with a hollow hub member and a plurality of bearing rollers therein, of means to hold said bearing rollers in spaced relation adjacent the inner periphery of the hub member, comprising a pair of washer-like retainers adapted to enter the ends of said hub member and a plurality of flat projections extending inwardly at right angles to the inner faces of said retainers between which the ends of said bearing rollers are seated, said projections being of a uniform width and thickness and spaced apart at their outer edges a distance greater than the diameter of said bearing roller and having their inner edges spaced apart a distance less than the diameter of said bearing roller.

In witness whereof, I have hereunto affixed my signature in the presence of the witnesses herein named.

WILLIAM R. WILSON.

Witnesses:
T. J. HARRELL,
RICHARD D. EDER.